RECORDING AND REPRODUCING COLOR PICTURE INFORMATION

Filed May 5, 1966 2 Sheets-Sheet 1

INVENTORS
PETER C. GOLDMARK &
ABRAHAM A. GOLDBERG
BY
Brumbaugh, Free, Graves & Donohue
their ATTORNEYS INVENTORS
PETER C. GOLDMARK &
ABRAHAM A. GOLDBERG
BY
Brumbaugh, Free, Graves & Donohue
their ATTORNEYS 3,479,447

RECORDING AND REPRODUCING COLOR PICTURE INFORMATION

Peter C. Goldmark and Abraham A. Goldberg, Stamford, Conn., assignors to Columbia Broadcasting System, Inc., New York, N.Y., a corporation of New York Filed May 5, 1966, Ser. No. 547,956
Int. Cl. H04n 1/46, 9/32
U.S. Cl. 178—5.2 20 Claims

ABSTRACT OF THE DISCLOSURE

Method and apparatus for recording and reproducing color picture information on a monochrome record medium including first and second displaced frames each having a pictorial record of brightness information in the original scene. Superimposed on the brightness record is a record of a carrier signal whose amplitude is modulated according to a color information signal. In the first frame the carrier signal is modulated with a first color information signal, while the carrier in the second frame is modulated with a different, second signal, with the two frames together representing all color information in the original scene. During reproduction, the two frames are scanned simultaneously to derive the modulated carrier signals and a brightness signal.

This invention relates to the recording on and reproducing of color picture information from a record medium. More specifically, the invention pertains to the recording of color picture information in the form of video signals on a non-color-sensitive record medium such as monochrome film, and to the reproduction of video signals from either the medium so recorded or from conventional cinematographic color film.

It has been previously proposed to record video signals containing color information on separate areas of a strip of monochrome film. In the usual case, video color signals representing the primary color content in the original image are recorded in distinct frame areas. Generally, each video color signal, i.e., the red, blue or green signal developed from scanning the original image, is recorded separately so that at least three individual recorded frame areas are required to record all the visual information of a complete original scene. In some known systems, brightness information is recorded separately from the color information which then occupies only two additional frames; that is, the visual information is still recorded on three frames, but one frame contains only brightness information and each of the remaining frames primary color information. To reproduce such information, all three areas must be scanned simultaneously, or scanned sequentially at higher than conventional scanning rates and then stored for later reconstitution.

The disadvantages of the above methods lie, in part, in the increased complexity of the optics required for recording and reproducing from three rather than a lesser number of frames. Further, the use of more frames to record the original scene takes up additional space on the medium. To avoid the seriousness of the latter disadvantage, color information is sometimes recorded in considerably compressed, anamorphosed frames. This, in turn, demands greater accuracy in registration of the scanning beam with the position of the record medium in order to obtain reasonably good color definition.

In a copending application, Ser. No. 375,469 filed June 16, 1964, and assigned to the assignee of the present invention, there are disclosed systems for recording and reproducing color information from a monochrome film strip. In those systems, as in the present invention, the original scene is scanned conventionally to develop video signals including a brightness, or luminance, signal and two separate chrominance or color signals. In the former systems the two color signals are used to modulate the phase and amplitude of a suppressed carrier signal. During recording, a radiant energy beam, such as that from a raster-scan cathode ray tube, is projected on the medium to record the picture information in a succession of contiguous transverse lines across the medium, each line corresponding to a scanned line of the original. As the beam sweeps transversely of the record, its intensity is modulated by a brightness signal and also by the carrier signal which, as noted, is being simultaneous modulated by the two chrominance signals. The result is a series of transverse lines across the medium containing a brightness information record upon which is superimposed the modulated carrier.

In order to avoid the visibility of the carrier during reproduction of the picture record on the record medium, the carrier is suppressed and a pilot carrier having a frequency which is a submultiple of the color carrier is recorded along the line in superimposed relation to the brightness and color information.

One aspect of the present invention deals with alternate methods of recording the chrominance signals on the medium. It is known that conventional color television systems can tolerate color resolution which is considerably less than the resolution of brightness information required to reproduce an acceptably sharp picture. For example, the brightness video signal may be alloted a frequency bandwidth in excess of 3 megacycles, whereas color information may be contained within a bandwidth of about 1.5 megacycles. In other words, picture brightness information provides definition, whereas color information supplies only a color 'wash" which, when superimposed on the brightness picture, is inseparable from the composite television scene by the human eye under normal viewing circumstances. In a related situation, it has been found that, in the usual case, color information contained, for example, on one frame of a color motion picture film does not differ greatly in content and position from the color information in an adjacent frame. This permits a brightness information video signal, developed by scanning one original scene, to be combined with color information derived from a following scene, where there is continuity between the subject matter of successive scenes.

Accordingly, in the systems to be disclosed in detail herein, brightness information and a color carrier signal modulated by one of the chrominance signals are recorded on the medium in longitudinally displaced transverse lines extending across a first series of frames, and the brightness information and the color carrier modulated by the other of the chrominance signals along transverse lines in a second series of frames on the medium. During reproduction, one frame of each of the series is scanned simultaneously with the other, resulting in two video signals, each containing brightness information and the amplitude modulated color carrier. In a preferred embodiment of the invention, the carrier signals modulated by the respective chrominance signals are recorded in alternate frames. Recording the two chrominance signals in separate frames permits extraction of the brightness and color video signals, at the same time avoiding the use of a pilot carrier. Moreover, the number of frames required to record a given sequence of scenes is not increased over the number of frames used to record black and white picture information carried on conventional motion picture film from which the original scenes may be taken.

Further aspects of the invention relate to reproducing apparatus which may be used to reproduce video signals from a medium recorded in the manner briefly described above, as well as to reproduce video signals from standard color motion picture film. When "playing" a monochrome film recorded by the method outlined above, one frame of each series is scanned simultaneously with a frame of the other by a radiant energy beam to generate the brightness and two chrominance signals. When reproducing from color film, scanning is identical to that used with the monochrome record. Through the use of color selective filters, the brightness and two primary color video signals are generated and then fed directly into a television kinescope or to a color signal matrixing network for generation of a full NTSC color television signal.

For a better understanding of these and other aspects of the invention, together with the objects and further advantages thereof, reference may be made to the following detailed description and to the drawings, wherein.

Recording

Figure 1:
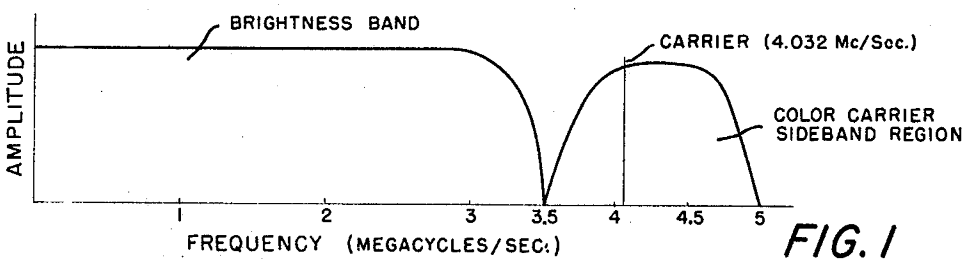
FIGURE 1 is a graph of a typical frequency spectrum showing the frequency content of video brightness and color signals recorded on the medium in accordance with the invention.

In recording color picture information on monochrome film, both color and brightness information must take a format which allows their separation when the recorded picture is to be reproduced. In the present invention, the brightness and color signals which are developed occupy separate portions of the frequency spectrum. As shown in FIGURE 1, picture brightness information may be contained within a bandwidth ranging from 0–3.5 mc./sec. and color information within the frequency range of approximately 3.5–5 mc./sec., Chroma intelligence produced by scanning the original is used to modulate a color carrier signal preferably having a frequency which is a multiple of the horizontal scan rate (15,750 c.p.s. in the United States), say 4.032 mc./sec. Assuming that the modulating color signal is limited to frequencies between 0 and 500 kc./sec., the color carrier sideband region extends between approximately 3.5 megacycles and 4.5 megacycles.

Figure 2:
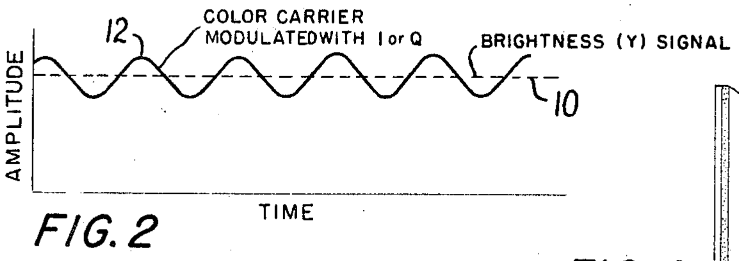
FIGURE 2 is a graph illustrating the amplitudes of representative video signals recorded in accordance with the invention.

FIGURE 2 illustrates the amplitude variations versus time of a constant brightness signal 10 and the envelope of a color carrier signal 12 representing color information of constant hue and/or saturation along a scanned line of the original. As shown, the brightness (Y) signal 10 is of constant amplitude, corresponding to picture information of constant brightness along the path of the scanning line. The chrominance signals modulating the color carrier may be either color difference signals, e.g., $R-Y$ or $B-Y$, or standard color encoded signals I or Q, as used in NTSC color transmission. In the latter example, since I and Q represent color hue and saturation, the color carrier waveform will be of constant amplitude, i.e., unmodulated, when a scanned line of the original contains none of the primary colors.

Figure 3:
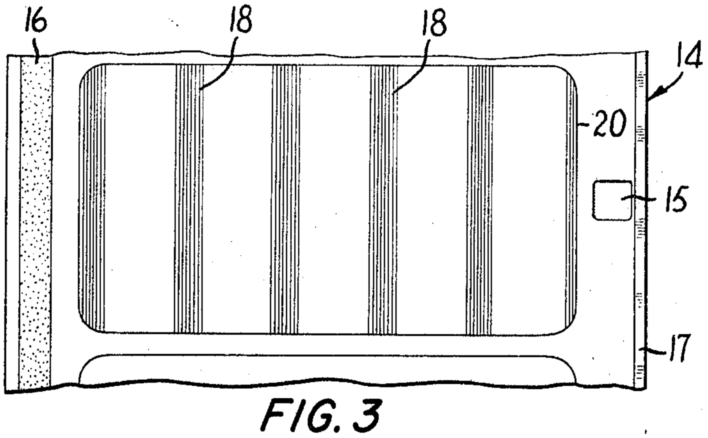
FIGURE 3 is a plan view representation of a portion of a film strip recorded with the signals shown in FIGURE 2.

FIGURE 3 illustrates a film record resulting from the recording of the signal in FIGURE 2 upon a monochrome film-strip 14. As illustrated, the strip may contain sprocket holes 15 near one edge and a longitudinal strip of magnetic sound track 16 near the other edge. A balance stripe 17 next to the sprocket holes 15 makes the film of equal thickness at each edge to facilitate coiling about a spool. In recording, a radiant energy (light) beam is caused to sweep periodically across the record and its intensity is simultaneously modulated by the composite signal, such as that shown in FIGURE 2, to produce tone density or light transmissivity variations across the strip corresponding to the brightness information and the color carrier waveform. As noted earlier, it is preferable that the color carrier have a frequency which is a multiple of the line scanning rate. In such case, the phase of the color carrier at the beginning of the recorded lines is approximately the same, and the carrier appears on the record as a series of transversely spaced longitudinal lines 18 (greatly exaggerated in the transverse direction in FIGURE 3) of which the tone density varies in accordance with the strength of the modulating chrominance signal. Each frame 20 on the record medium corresponds to one complete scanned frame of the original. Thus when a 60 field-30 frame scanning rate is used as is standard in the United States, the medium will also be recorded at a 60 field-30 frame rate.

In accordance with the invention, a first color information signal, e.g., I or the color difference signal $R—Y$, is employed to modulate the amplitude of the color carrier during the periods of time in which a first series of frames is being recorded, and second color information, e.g., Q or $B-Y$, is used to modulate the color carrier during the times when a second series of frames is being recorded.

Figure 4:
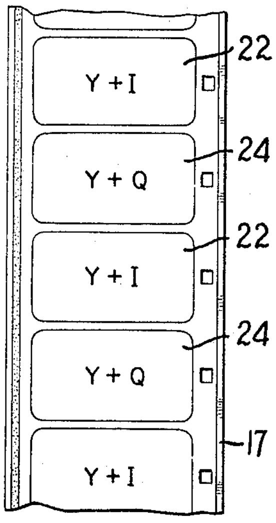
FIGURE 4 is a plan view of a portion of a film strip in accordance with the invention, showing the recording sequence of brightness and chrominance signals thereon.

In FIGURE 4, for example, a first series of alternate record frames 22 contains brightness (Y) and first color (I) information, and a second series of alternate frames 24 contains brightness (Y) and second color (Q) information. During reproduction of the record shown in FIGURE 4, adjacent frames are scanned simultaneously to produce two video signals, one of which is comprised of $Y+I$ video information, and the other of $Y+Q$ video information. The I and Q signals are then separated from the composite brightness and color video signal, yielding individual Y, I and Q signals which may then be inserted at the appropriate locations in a television receiver or used to generate a standard NTSC transmission signal.

It will be appreciated that using the present method of recording color information, a pilot or reference carrier is not necessary as in the case where the color carrier is modulated in amplitude and phase in accordance with the first and seocnd color information. In the latter instance, since the color carrier is suppressed, the pilot carrier is necessary to provide a reference phase for separation and demodulation of the two modulating color signals as the film is scanned during reproduction.

Figure 5:
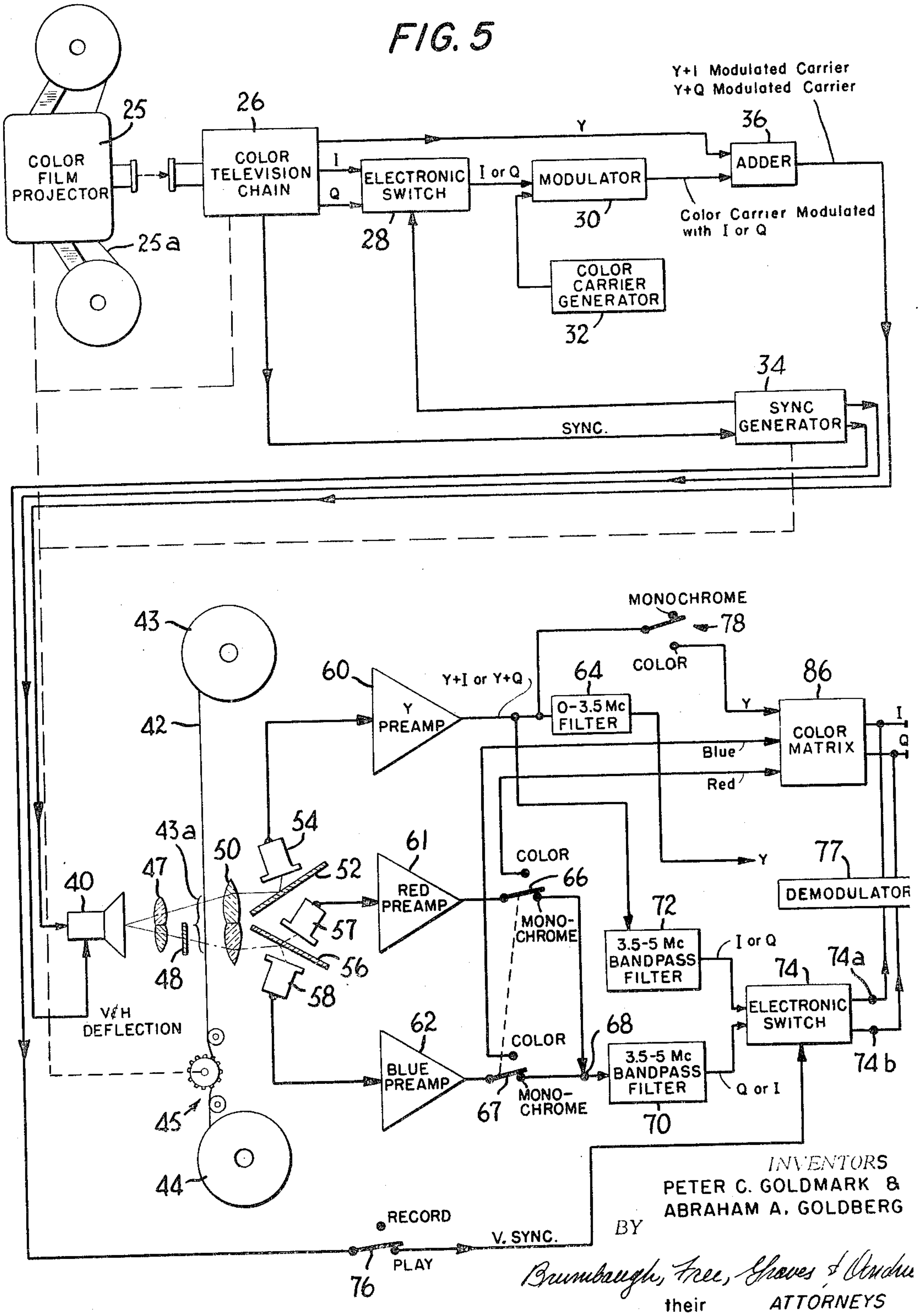
FIGURE 5 is a schematic block diagram of a recording reproducing system in accordance with the invention.

Referring now to FIGURE 5 there is shown a system for recording a film strip in accordance with the procedure just described, and for generating video signals, during reproduction, from both the recorded film and color motion picture film. By way of example, the system will be described in connection with the recording of color picture information contained on a motion picture color film to produce the record medium illustrated in FIGURES 3 and 4. As shown, the original motion picture color film 25a is run through a color film projector 25 using a 2–3 film frame pull-down advancement sequence. The advancing mechanism is synchronized with the vertical frame rate of the television cameras in the television chain 26, as indicated by the dashed-line connection. If a 60 field-30 frame per second scanning rate is used, one frame of the motion picture film will be held stationary while the television cameras complete two scanning fields. The film is then advanced one frame and held stationary while the television cameras scan three fields of the successive frame, and so on. The scanning conversion rate between 24 frame per second motion picture film and the 60 field television scanning rate is thus satisfied.

The video signals at the output of the color television chain are the luminance or brightness (Y) signal, a first chrominance signal (I), and a second chrominance signal (Q), these signals having a frequency content compatible with the allocated portions of the bandwidth spectrum shown in FIGURE 1. It is understood that while in the system shown, the signals corresponding to the red, green and blue primary colors of the original have been matrixed to yield I and Q signals as denfied by NTSC standards, the signals at the output of the color television chain 26 could also be color difference signals e.g., $R-Y$, $G-Y$ or $B-Y$.

From the color television chain 26, each of the I and Q signals is coupled to an input terminal of an electronic switch 28 which sequentially selects one or the other of the chrominance signals for passage to the modulator 30 in which a color carrier signal (the 4.032 mc./sec. signal in FIGURE 1) supplied by the generator 32 is modulated by the selected chrominance signal, I or Q. A synchronizing generator 34 is slaved to the vertical and horizontal synchronizing pulses from the color television chain 26 and furnishes trigger pulses synchronized with these vertical synchronizing pulses to the electronic switch 28. In this manner, the electronic switch 28 is energized to select either I or Q in the desired sequence. If, for example, the sequence in FIGURE 4 is used in which I and Q information is recorded in alternate frames of the record medium, the electronic switch 28 is activated at the end of each scanning field.

From the modulater 30, the chrominance-modulated carrier signal is fed to an adder 36 which adds the Y video signal to the modulated carrier, thus resulting in a composite video signal of the form shown in FIGURE 2.

At the output of the adder 36, the video signal containing $Y+I$ information issued to modulate the intensity of a scanning beam in the cathode ray tube 40 when the electronic switch has seletced the I signal, and to modulate the intensity of the beam in accordance with $Y+Q$ information when the electronic switch 28 is in its alternate position. Vertical and horizontal deflection signals synchronized with the scanning rate of the color television chain 26 are also fed to the cathode ray tube 40 so that the transverse lines recorded on the record medium 42 correspond to the scanned lines of the original.

During recording, the record medium 42 is advanced from a supply reel 43 through a scanning zone indicated generally at 43*a*, where the scanning beam exposes the record medium, and onto a take-up reel 44. As shown, the drive means for the medium 42 comprises a sprocket wheel drive unit 45 which advances the medium at a rate and sequence depending on the particular scanning operation involved. In this connection, it should be noted that seriatim line-by-line scanning of the original film or standard television scanning of two 60 c.p.s. interlaced fields per frame can be used. In the former case, the vertical position of the scanning beam from the cathode ray tube 40 is held stationary and the medium 42 is continuously advanced through the scanning zone 43*a*. When standard television scanning practice is used, the advancement of the medium 42 will be intermittent so that one complete television frame is recorded before the record medium again is advanced. In either case, advancement of the medium is synchronized with advancement of the color film through the projector 25 and with the scanning rate of the color television chain 26, as indicated by the dashed-line connection between the sprocket wheel drive unit 45 and the projector 25 and television chain 26.

Reproduction

For convenience, the reproducing portion of the FIGURE 5 system will be described in connection with the reproduction of video information from the film strip shown in FIGURE 4, in which the I and Q color signals are recorded in alternate frames. During recording and reproduction, the scanning beam from the cathode ray tube 40 is directed at the film through a split objective lens 47. However, since the apparatus records only one frame at a time, the path of the lower scanning beam passing through one side of the lens 47 is intercepted by an opaque mask 48. During reproduction the mask 48 is removed (see FIGURE 6) so that two images of the scanning beam, spaced apart by the pitch distance between frames, are focused on the film strip 42 in the scanning zone 43*a*. As the two beams, or beam images, pass through adjacent frame areas of the film 42, they are modulated in intensity by the brightness information and the I and Q carrier waveforms recorded on the transverse lines in those frames. Afterwards, the beams encounter a split collecting lens 50 which directs one of them to a plane mirror 52 which reflects the beam into the photomultiplier tube 54. The other of the beams, after passing through the split collecting lens 50, is intercepted by a dichroic blue-reflecting, red-transmitting mirror 56, the purpose of which will be explained shortly. This mirror 56 transmits a portion of the beam light into the photomultiplier 57 and the remaining portion of the light from the scanning beam into the photomultiplier tube 58. The video signals at the outputs of the photomultiplier tubes 54, 57 and 58 are amplified in the preamplifiers 60, 61 and 62, respectively.

During the time in which the upper scanning beam impinges a frame upon which $Y+I$ information has been recorded, the lower scanning beam is interrogating an adjacent frame which contains Y and Q information. The $Y+I$ signal from the preamplifier 60 is then processed through a low-pass 0–3.5 mc./sec. filter 64 which blocks the signal frequency containing the I signal waveform, and only the Y signal appears at the filter output. At the same time, $Y+Q$ signals developed by scanning an adjacent frame with the lower beam are present at the output of the preamplifiers 61 and 62, which signals are weaker in amplitude than the signal at the output of the preamplifier 60 due to brightness filtering in the dichroic mirror 56. These signals are routed through ganged selector switches 66 and 67 and added at 68 before being processed through a 3.5–5 mc./sec. bandpass filter 70. The function of the filter 70 is to extract the Q carrier waveform from the composite $Y+Q$ video signal.

Similarly, the $Y+I$ composite video signal from the preamplifier 60 is processed through the bandpass filter 72 which also removes the brightness (Y) component from that video signal. The extracted I and Q carrier signals then pass through an electronic sequencing switch 74 which directs the I modulated carrier signal to the output terminal 74*a* and the Q modulated carrier signal to the output terminal 74*b*.

After the film 42 has advanced one frame, the upper scanning beam interrogates the next frame which contains $Y+Q$ intelligence, whereas the lower beam scans the frame which was previously scanned by the upper beam to develop the $Y+I$ signal. At the same time that the medium 42 advances from one frame to the next, the electronic switch 74 reverses the connections between the filters 72 and 70 and the respective switch terminals 74*a* and 74*b*. In this manner, the I and Q waveforms impressed on the carrier always appear at the same terminal regardless of which of the frames, i.e., $Y+I$ or $Y+Q$, is being interrogated by the respective scanning beams. To maintain synchronization among the advancement of the strip 42, the scanning rate of the cathode ray tube 40, and the switching operation of the electronic switch 74, the selector switch 76 is thrown from the "RECORD" to the "PLAY" position and vertical synchronizing pulses are supplied to the electronic switch 74 from the synchronizing generator 34, which also regulates the action of the sprocket wheel drive 45 during reproduction. The dual conventional demodulator 77 detects the original I and Q waveforms from the modulated carrier, and thereafter these chrominance signals may be utilized in any of the ways prescribed above.

Color film reproduction

Figure 6:
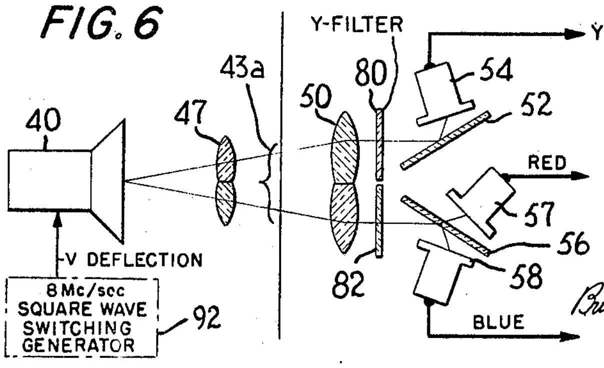
FIGURE 6 is a schematic representation of a portion of the system shown in FIGURE 5, illustrating an adaptation of the system to the generation of video signals from color motion picture film.

When it is desired to play conventional motion picture color film, the selector switches 66 and 67 and a selector switch 78 at the output of the Y preamplifier 60 are moved from the "MONOCHROME" position to the "COLOR" position. Referring to FIGURE 6, the scanning of the color film is carried out in a manner similar to the scanning process just described. When playing color film, however, a Y-filter device 80 is inserted in the upper scanning beam path between the collecting lens 50 and the mirror 52. This type of filter device, which may be conventional, resolves the primary color components contained in one of the film frames and optically combines them in predetermined proportions to produce at the output of the photomultiplier 54 a video signal having the same color luminosity composition as an NTSC brightness (Y) signal. In the lower beam path is inserted a negative green filter 82 which removes any green primary color from the portion of the beam passing through an adjacent frame and striking the dichroic mirror 56 and transmits the magenta color components. The signal output of the photomultiplier 57, therefore, represents only the red (R) primary color contained in the original, and the photomultiplier 58 develops a signal which represents only the blue (B) primary color content of the original.

Returning now to FIGURE 5, the output of the Y preamplifier 60 is a signal corresponding to only brightness information which is bypassed around the filter 64 by the switch 78 and applied directly to a color signal matrixing network 86. Similarly, the outputs from the red preamplifier 61 and blue preamplifier 62 are routed through the selector switches 66 and 67 to the red and blue inputs of color matrix 86. In the matrix the Y, R and B video signals are admixed in the proper proportions to yield NTSC I and Q signals. In applications where the color film being reproduced is to be played directly on a television receiver, the R and B signals may be amplified and utilized without further processing at the respective electron guns of the receiver kinescope. In this case, the R and B signals may be matrixed with the Y signal to derive a green (G) signal for immediate application to the picture tube, along with the R and B video signals.

Figure 7:
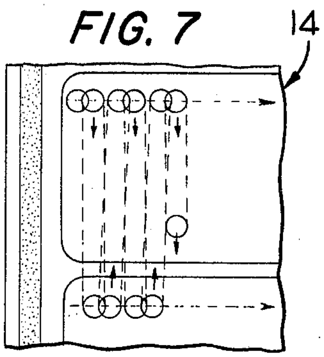
FIGURE 7 is a plan view of a portion of a film record showing the path of a scanning beam in an alternate form of scanning pattern usable with the FIGURE 5 system.

In the systems of FIGURES 5 and 6, adjacent frames of either monochrome film recorded with video signals or standard motion picture color film, are scanned by optically splitting the image of the scanning beam from the cathode ray tube 40. FIGURE 7 illustrates an alternate method of scanning the record medium. There the scanning beam is periodically switched between first and second vertical positions at a rate substantially greater than the horizontal scanning rate of the beam. Preferably, the frequency at which the beam is switched between the two vertical positions is at least twice the color carrier frequency in order to preserve the ability of the system to reproduce the color carrier with reasonably good resolution. For example, at a beam switching rate of approximately 8 mc./sec. and using a square deflection waveform, the scanning beam spot 90 on the record 14 leaves and returns to the same scanning line of each frame approximately twice during the transverse passage of the beam along a single cycle of the recorded color carrier waveform. This scheme is shown by the 8 mc./sec. squarewave generator 92, indicated by the phantom lines in FIGURE 6, which may be connected to the vertical deflection system of the tube to rapidly switch the beam of the cathode ray tube 40 between first and second vertical positions for simultaneously reading out a frame of each frame series.

A further scanning alternative is to use a dual beam CRT in which the horizontal scanning actions of the two beams are synchronized with each other. The beams are then used on adjacent frames of the record medium in a manner similar to that illustrated in FIGURE 5.

Although the invention has been described with reference to specific embodiments thereof, it is understood that many variations and modifications, both in form and detail, may be made within the skill of the art. Accordingly, all such modifications and variations are intended to be included within the scope and spirit of the invention as defined in the appended claims.

We claim:

1. In a method of recording color picture information from an original scene on a radiant energy-sensitive record medium, the steps of: sequentially scanning first and second areas of the record medium with a radiant energy beam at a given line scan rate to record on the medium, within the respective areas thereof, a series of longitudinally displaced transverse lines; modulating the intensity of the beam in accordance with a carrier signal having a frequency substantially greater than the line scan rate, developing first and second color information signals representing the color content in the original scene, sequentially modulating the amplitude of the carrier signal with said first and second color information signals to effect the recording thereof in the first and second areas, respectively, and simultaneously modulating the intensity of the beam as a function of the brightness of the picture information.

2. A method as defined in claim 1 in which the first and second color information signals together represent color saturation and hue of the picture information.

3. A method according to claim 1, further comprising the step of longitudinally conveying the record medium past a scanning zone to produce the recording of the carrier signal modulated by the first and second color information signals, respectively, in alternate longitudinally spaced frames on the medium.

4. Apparatus for recording original color picture information from original scenes on a radiant energy-sensitive record strip comprising: means for conveying the strip in the direction of its extent past a scanning zone; means for periodically sweeping a radiant energy beam transversely of the strip at a given line scan rate to record thereon a series of substantially contiguous transverse lines; means for modulating the intensity of the beam with a carrier signal; television camera means for developing first and second signals together representative of the color information in the scenes; means for sequentially modulating the carrier signal with said first and second color information signals representing the color content of a scanned line of the original scenes to effect the recording of the carrier containing the first and second color information signals, respectively, in first and second series of frames on the record medium; and means for simultaneously modulating the intensity of the beam as a function of the brightness of the picture information in the respective scenes along a corresponding scanned line of the original.

5. Apparatus in accordance with claim 4 in which the carrier signal frequency is a multiple of the line scan rate.

6. Apparatus in accordance with claim 4 in which the first and second color information signals represent color hue and saturation along the scanned line of the original.

7. Apparatus in accordance with claim 4 in which the frames of the respective series are spaced in the direction of conveyance of the record strip.

8. Apparatus according to claim 4 wherein the sequence of carrier modulation is effective to record the frames of the first series in alternation with the frames of the second series.

9. In apparatus for recording and reproducing color picture information from original scenes; means for conveying an elongate radiant energy-sensitive record medium past a scanning zone; means for periodically sweeping a radiant energy beam transversely of the medium in the scanning zone at a given rate to cause, during recording, the recording on the medium of a series of longitudinally displaced transverse lines and so as, during reproducing, to effect line-by-line interrogation by the beam of the lines so recorded; means for modulating, during recording, the intensity of the beam with a carrier signal; television camera means for developing first and second color information signals representing the color content of a corresponding line of the picture; means for sequentially modulating the carrier signal with said first and second color information signals to effect the recording of the carrier containing the first and second color information signals, in first and second series of frames on the medium, respectively; means for simultaneously modulating the beam during recording with a video signal representing brightness information in each respective scene; first means responsive during reproduction to the radiant energy from the beam impinging a frame of the first series for developing a first video signal containing the brightness and modulated carrier information recorded thereon; and second means responsive during reproduction to the radiant energy from the beam impinging a frame of the second series for developing a second video signal containing the modulated carrier information recorded thereon.

10. Apparatus as set forth in claim 9 in which the frequency of the modulated carrier signal is distinct from the frequency of the brightness information contained in the first video signal, and further comprising frequency selective means for extracting the modulated carrier signal frequency from the first video signal.

11. A record medium for the recording and reproduction of original color picture information in a plurality of original scenes comprising: an elongate strip of transparent material having recorded thereon a first and second series of mutually spaced information bearing frames; each of the frames of the first and second series containing a pictorial record of brightness information in a respective original scene; each frame of the first and second series of frames further containing a second record of a periodic waveform in elemental parallel zones extending across the frames, the carrier recorded in the first series of frames being modulated in amplitude according to first color information along the corresponding zones of the respective original scene and the carrier recorded in the second series of frames being modulated in amplitude according to second color information along said corresponding zones of the respective original scene.

12. A record medium as set forth in claim 11 in which the individual frames of the first series alternate with the individual frames of the second series longitudinally of the strip.

13. A record medium as set forth in claim 11 in which the second record is a carrier signal which is modulated in amplitude by the periodic waveform so as to appear on the record as tone density variations.

14. In apparatus for reproducing color picture information in the form of video signals from a record strip having picture information recorded thereon in first and second series of mutually spaced frames, the first and second series of frames each comprising a first pictorial record of picture brightness information in a respective original scene and a series of parallel elemental zones extending across each said frame containing a second record of a periodic waveform, the waveform in said first series being amplitude modulated according to first color information along corresponding zones of respective original scenes, and the waveform in said second series being amplitude modulated according to second color information along said corresponding zones, the combination of: means for longitudinally conveying the record strip past a scanning zone; means for simultaneously scanning one frame of each of the first and second series of frames in the scanning zone with a radiant energy beam; means responsive to the radiant energy from the beam impinging the strip for generating first and second composite video signals, each composite video signal containing a first signal component representing said brightness information and a second signal component at a distinct frequency representing the modulated periodic waveform, said second signal component of the first video signal corresponding to the first color information and said second signal component of said second video signal corresponding to the second color information.

15. Apparatus as set forth in claim 14 in which the frames are longitudinally displaced and the scanning means scans the frames seriatim, and further comprising means for separating the second signal components from the respective video signals; and switch means receiving the separated second signal components and synchronized with the longitudinal motion of the record strip, the switch means having first and second output terminals and being effective to continually direct the second signal components carrying first and second color information to the respective output terminals.

16. Apparatus in accordance with claim 14 usable with motion picture color film in place of the record strip in which the scanning means simultaneously scans first and second successive film frames: the apparatus further comprising optical filter means for restricting the content of the first video signal to the brightness information along the scanned lines of the first fame; second filter means for restricting the content of the second video signal to information representing primar color content of the film along the scanned lines of the second frame; and means responsive to the radiant energy from the beam impinging the second frame for generating first and second primary color component signals representing first and second primary color content of the film along the scanned lines of the second frame.

17. Apparatus in accordance with claim 14 in which the scanning means comprises a cathode ray tube productive of the scanning beam, and optical means for simultaneously focusing the beam onto separate ones of the frames of the first and second series.

18. Apparatus as defined in claim 14 in which the scanning means includes a cathode ray tube productive of the scanning beam, means for alternately switching the beam between first and second longitudinally spaced positions at a rate exceeding the line scan rate, and means for focusing the beam, when in the respective positions, onto separate ones of the frames of the first and second series.

19. Apparatus as defined in claim 14 in which the scanning means includes a cathode ray tube productive of two longitudinally spaced radiant energy beams; and means for focusing the respective beams onto separate ones of the frames of the first and second series.

20. Apparatus for recording color picture information of original scenes on a monochrome record medium, comprising:

color television camera means for scanning each original scene and developing thereby a signal representing brightness information along scanned parallel elemental zones of the original scene, and first and second color information signals each representing a component of color information along said elemental zones;

switch means synchronized with the rate at which the original scenes are scanned by the television camera means and responsive to the first and second color information signals to alternately select said color information signals;

a color carrier generator for producing a carrier signal at a frequency exceeding the rate at which the elemental zones of the original scene are scanned;

a modulator jointly responsive to the selected color information signal and to the carrier signal to amplitude modulates said carrier signal with said selected color information signal;

means for combining the modulated carrier signal and the brightness signal;

means for conveying the record medium to be recorded through a scanning zone; and recording means including a recording beam scanning the record medium in the scanning zone in series of mutually displaced scan lines and responsive to the combined signals to record such signals containing the first color information in a first series of frames on the record medium and to record such combined signals containing the second color information in a second series of frames on the record medium.

References Cited

UNITED STATES PATENTS

| | | | |
|---|---|---|---|
| 2,736,762 | 2/1956 | Kell | 178—5.4 |
| 2,769,028 | 10/1956 | Webb | 178—5.4 |
| 2,953,633 | 9/1960 | Hughes | 178—5.2 |

RICHARD MURRAY, Primary Examiner